(12) United States Patent
Turner

(10) Patent No.: US 6,360,450 B1
(45) Date of Patent: Mar. 26, 2002

(54) ADJUSTABLE CALIPER

(75) Inventor: Tom Turner, Elgin, IL (US)

(73) Assignee: Control Gaging, Inc., Ann Arbor, MI (US)

( * ) Notice: Subject to any disclaimer, the term of this patent is extended or adjusted under 35 U.S.C. 154(b) by 0 days.

(21) Appl. No.: 09/559,708

(22) Filed: Apr. 27, 2000

(51) Int. Cl.[7] .............................. G01B 5/12; G01B 7/13
(52) U.S. Cl. ........................................... 33/783; 33/542
(58) Field of Search .......................... 33/783, 807, 808, 33/542, 558.01, 558.02, 558.03, 558.04, 558.2, 558.4, 558.5, 543

(56) References Cited

U.S. PATENT DOCUMENTS

| | | | | |
|---|---|---|---|---|
| 2,335,775 A | * | 11/1943 | Laughton | ..................... 33/542 |
| 2,502,051 A | * | 3/1950 | Kulcsar et al. | ................ 33/542 |
| 3,780,442 A | * | 12/1973 | Gresho | ......................... 33/542 |
| 4,447,960 A | * | 5/1984 | Golinelli et al. | ............... 33/783 |
| 4,493,153 A | * | 1/1985 | Esken | .......................... 33/783 |

* cited by examiner

Primary Examiner—Christopher W. Fulton
(74) Attorney, Agent, or Firm—Brinks Hofer Gilson & Lione

(57) ABSTRACT

A measuring device of the caliper type especially adapted to making inside diameter measurements. The caliper features the ability to change its set position and provide accurate measurements over an adjustable measurement range. The caliper is of compact configuration and is preferably formed from a single block of metallic material including machined features to provide a number of cooperating elements which are elastically coupled to one another. These features allow the separation distance between the probe tips to be adjusted without changing the output of the measuring device.

13 Claims, 5 Drawing Sheets

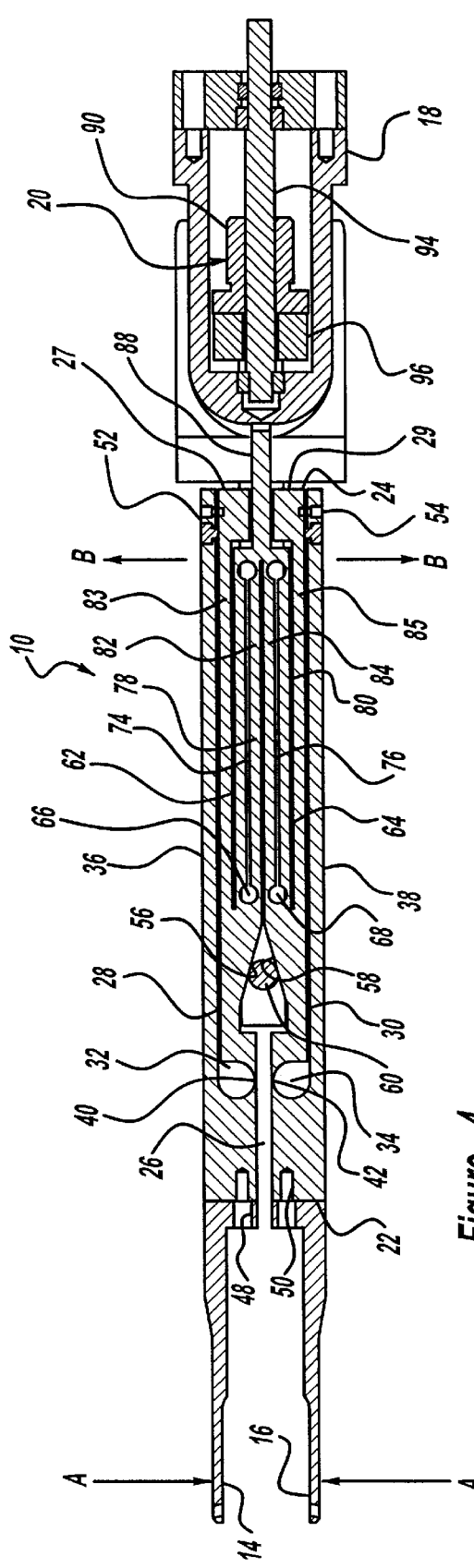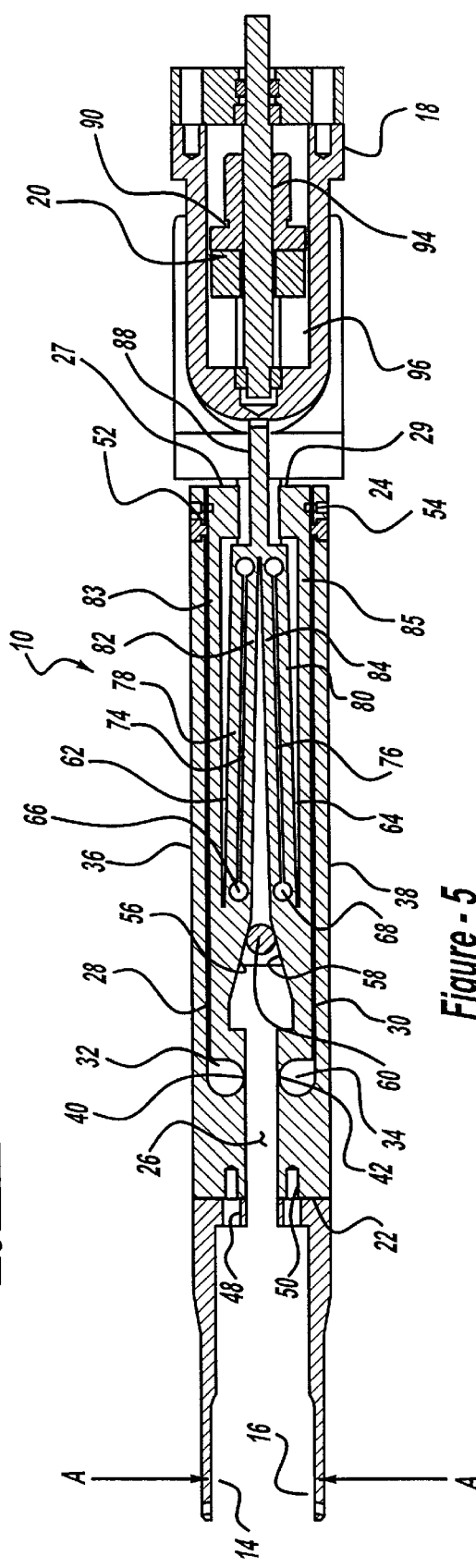

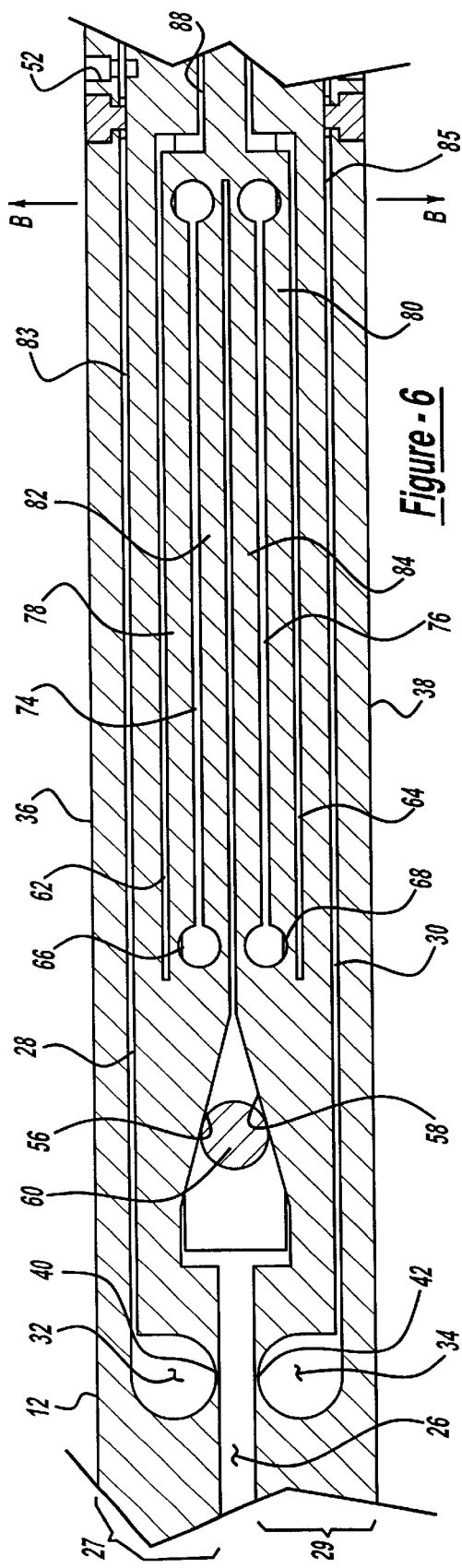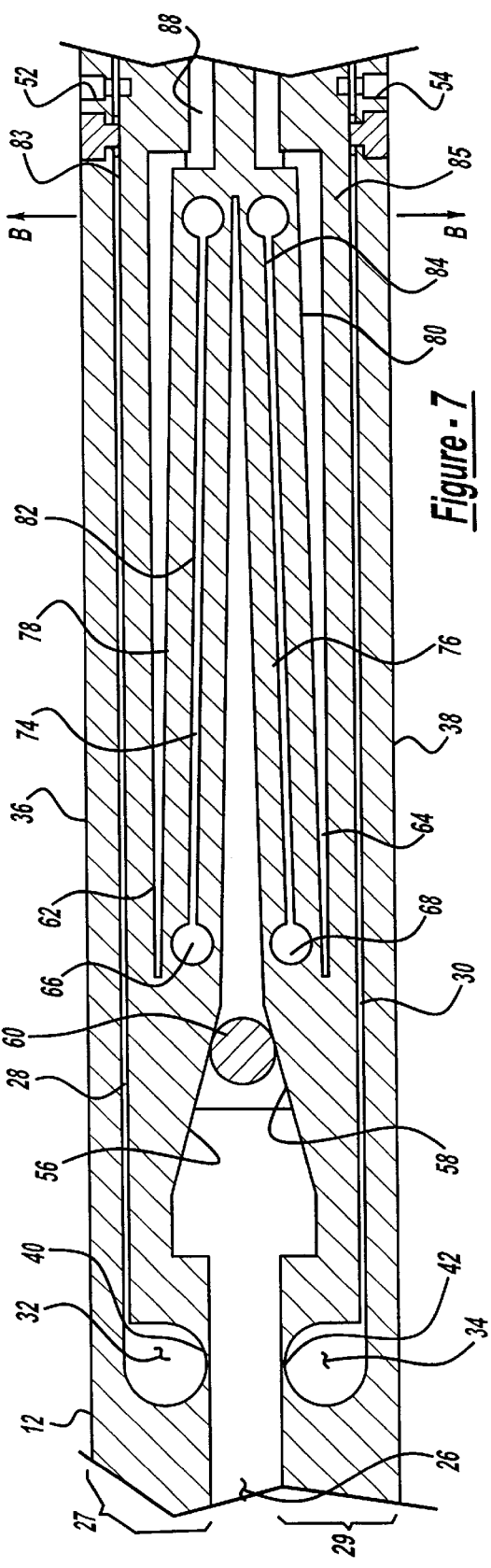

ADJUSTABLE CALIPER

BACKGROUND OF THE INVENTION

This invention relates to a gaging device, and particularly to one of the caliper type, adapted for measuring dimensions of work pieces by the difference in position between two probe tips.

Gaging devices are in widespread use in industrial applications. It is frequently necessary during machining or other fabricating processes to make precise dimensional measurements of features of a work piece. For example, during an internal grinding operation, it is often necessary to measure the inside diameter of a workpiece to stop the grind cycle when correct size has been achieved. Numerous types of gaging devices are presently in use. Typically, these devices include two or more probe tips, which are capable of relative movement upon contacting the features to be measured. The probe tips are coupled to a measuring device to provide an output related to the difference in position of the probe tips. For example, so-called air gage devices can be used in which a moveable, variable obstruction device causes a change in pressure drop across an orifice to occur with changes in relative probe tip positioning. An external air source and pressure measuring system is used to provide an output related to the dimension being gaged. Other devices, such as linear variable differential transformers (LVDTs) are also in use in such gaging devices.

In many gaging applications, compactness is an essential feature. For example, when measuring a workpiece diameter on an internal grinder, it is desirable to fit the gaging device within the confines of the workhead spindle of the grinder. For example, in some instances related to internal grinding, the measuring device must reach the workpiece diameter through the clearance in the center of the workhead spindle while the grinding wheel enters the workpiece from the opposite side. In such instances, the gage must be sufficiently compact so it makes no contact with the internal diameter of the workhead spindle.

In many gaging operations it is desirable for a gaging device to be readily adaptable for making various ranges of measurement. Typically, a gage device has a pre-determined and fixed measurement range. Only variations within the measurement range provide an output for the gage. In machine operations where various workpieces are machined and various features having varying dimensions must be measured, it is desirable to provide a gaging device useable for such varying situations. At the same time, expanding the measurement range should not occur at the cost of a lack of measurement accuracy.

Designers of gaging devices further strive to achieve temperature stability, accuracy, repeatability, low cost, and low maintenance requirements for the devices.

SUMMARY OF THE INVENTION

The caliper gage device in accordance with the present invention, achieves the above-referenced desirable features. The gage device includes a pair of probe tips mounted to a gage body. The gage body is formed from one piece of metal material and is machined, preferably using electrical discharge machining (EDM) processes for forming a number of relatively moving segments. The body features a split along its diametric plane which interacts with an adjustment device to cause these two halves to separate by a desired amount. This separation in turn enables probe tips mounted to the gage body to have varying set positions, without changing the output of the gage device. Thus, the device can be used for making distance measurements over a range of set positions. The design of the gage of the present invention is compact, such that it can be mounted to an internal grinding machine and reach the workpiece through the workhead spindle for diameter measurements. Furthermore, the gage device has few parts which reduce variability and fabrication cost, and improves reliability.

Additional benefits and advantages of the present invention will become apparent to those skilled in the art to which this invention relates from the subsequent description of the preferred embodiment and the appended claims, taken in conjunction with the accompanying drawings.

BRIEF DESCRIPTION OF THE DRAWINGS

FIG. 4 is a longitudinal sectional view of the gage device, showing the gage adjusted to an initial set position.

FIG. 5 is a longitudinal cross-sectional view of the gage device, similar to FIG. 4, but showing the gage tips adjusted to a second displaced position.

FIG. 6 is an enlarged, partial cross-sectional view taken from FIG. 4, showing the relatively moving elements of the gage body.

FIG. 7 is an enlarged, partial cross-sectional view, taken from FIG. 5 showing the relatively moving components of the body in a displaced position.

DETAILED DESCRIPTION OF THE INVENTION

Figure 1:
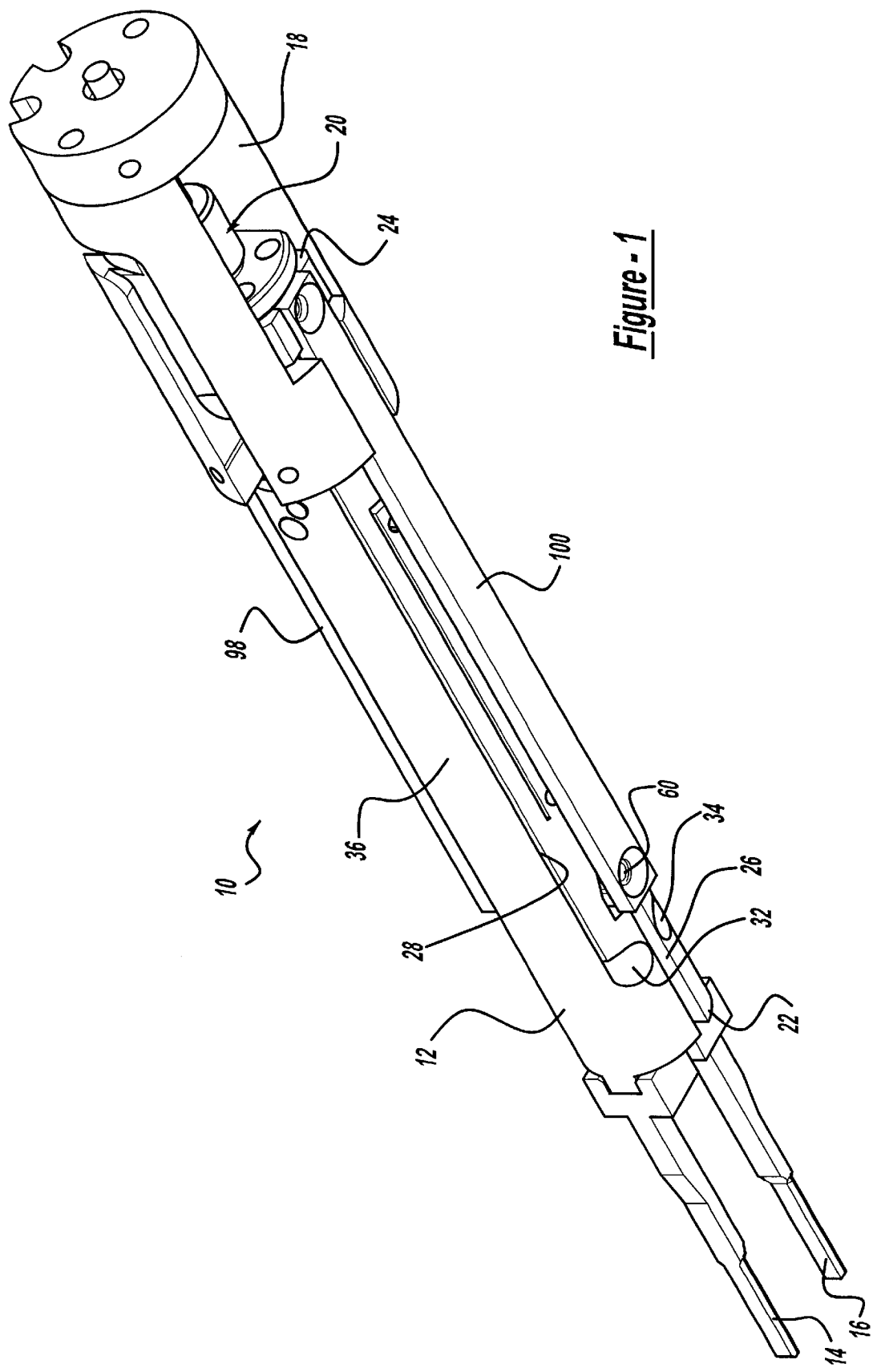
FIG. 1 is an isometric view of the adjustable caliper gage device in accordance with this invention.
Figure 2:
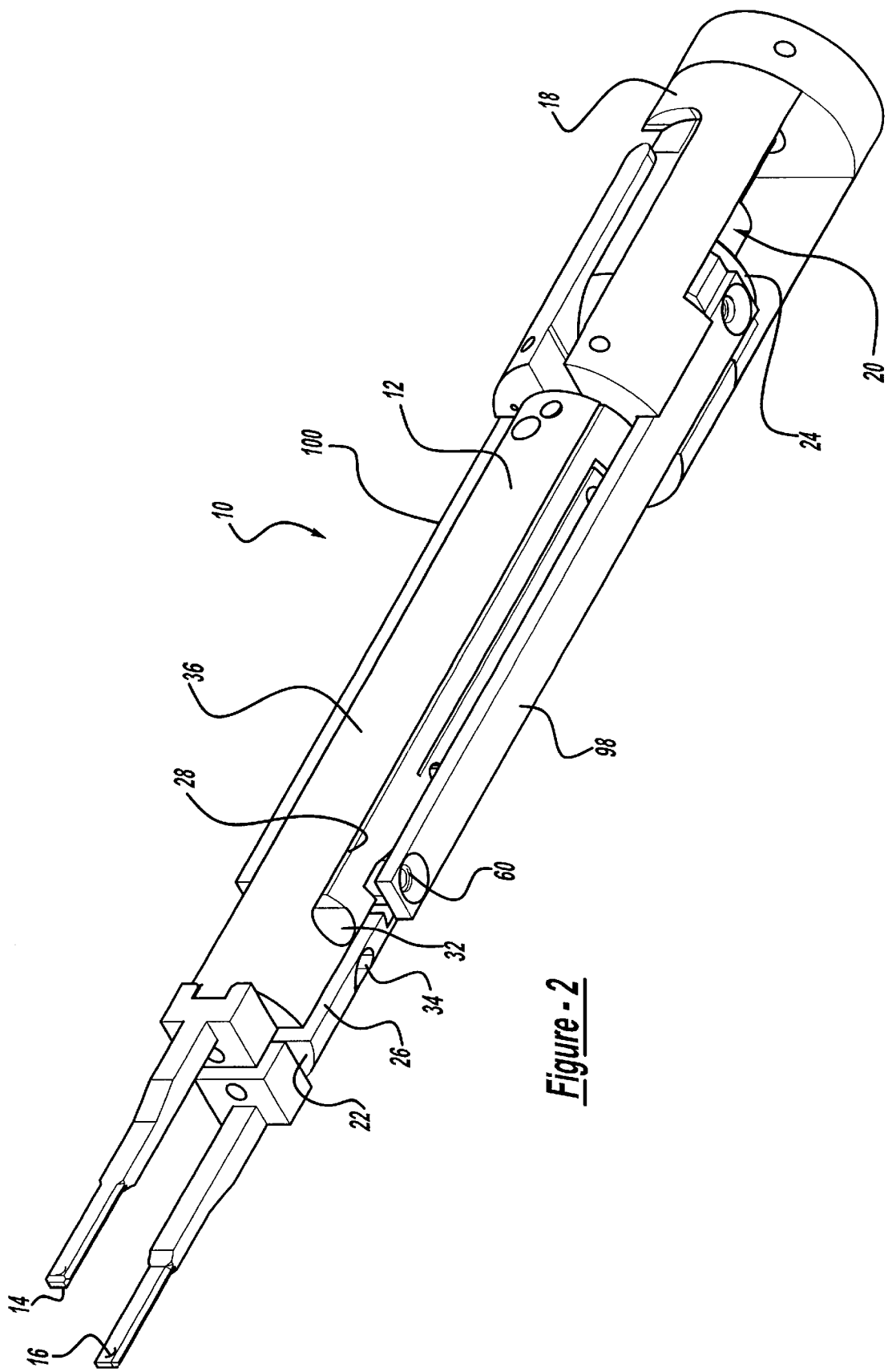
FIG. 2 is an isometric view, similar to FIG. 1, but showing the gage device from a different perspective.
Figure 3:
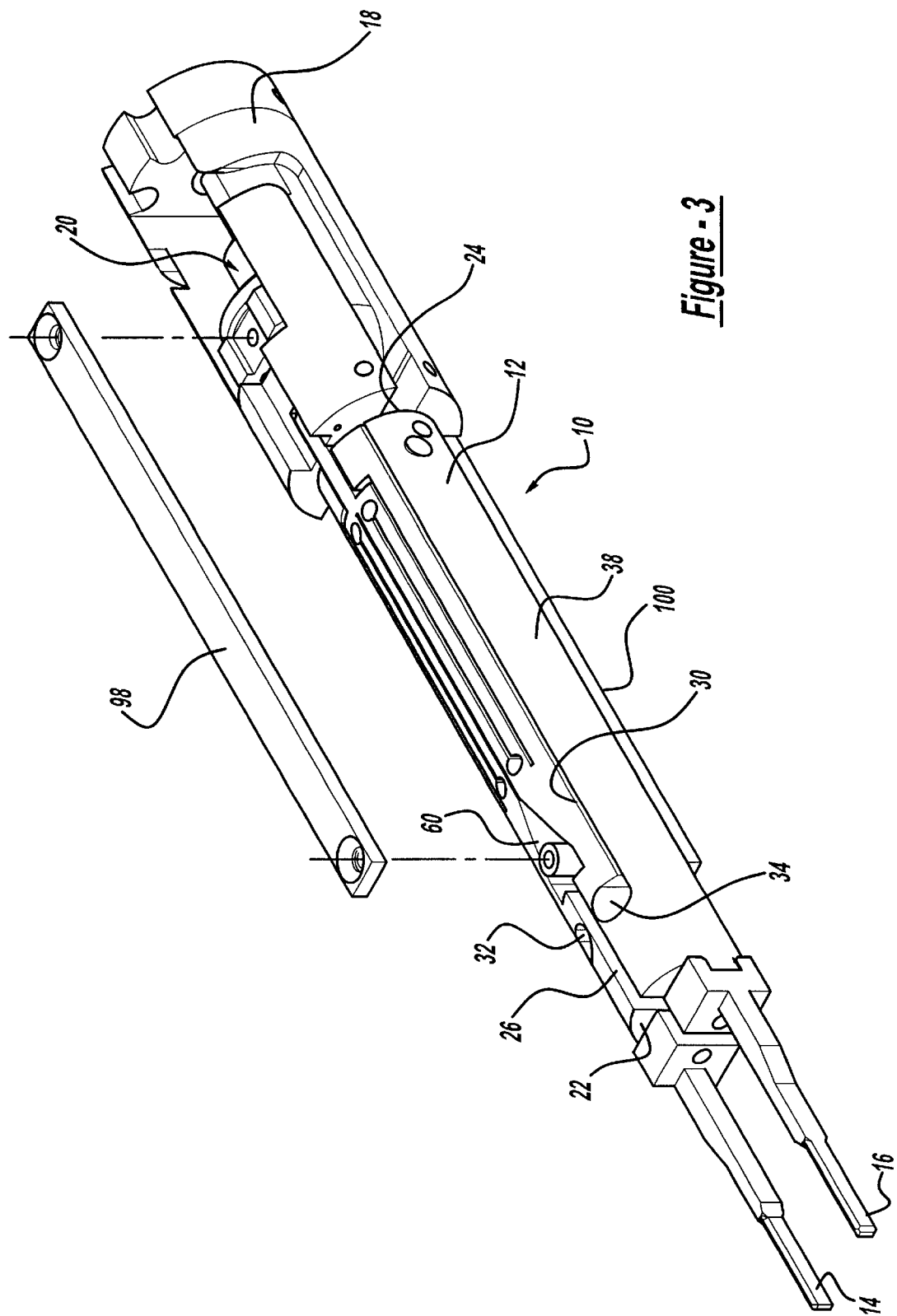
FIG. 3 is an isometric view of the gage device in accordance with this invention, showing a side-plate element exploded away from the remainder of the gage.

The gage device, in accordance with this invention, is shown in its fully assembled configuration in FIGS. 1 and 2, and is generally designated there by reference number 10. Gage 10 is principally comprised of gage body 12, probe tips 14 and 16, gage support block 18, and gage adjustment mechanism 20.

Gage body 12 is best described with reference to FIGS. 4 through 7 and is preferably formed of a dimensionally stable metal, such as Type 17-4 stainless steel. As is evident from the following description of gage body 12, a number of precision features are formed in the body. These features are preferably formed using EDM processes. Gage body 12 begins as a solid, cylindrically shaped, elongated blank. Gage body 12 features a cut through the body, along a diametric plane from distal end 22 to near the proximal end 24. This separation is designated by reference number 26 and forms a pair of body halves 27 and 29. Gage body 12 further features a pair of cuts 28 and 30, which extend from holes 32 and 34, and extend to proximal end 24. These cuts 28 and 30 define a pair of legs 36 and 38, which displace in response to a gaging measurement process, as will be described in more detail in the following. During measurement, legs 36 and 38 are permitted to spread away from the remainder of gage body 12. Holes 32 and 34 are cut to leave a thin web of material in the areas designated by reference numbers 40 and 42. These webs act as hinge points for legs 36 and 38.

A pair of probe tips 14 and 16 are mounted to gage body 12 using threaded fasteners (not shown) installed within bores 48 and 50. When making a diameter measurement, probe tips 14 and 16 interact with features of a workpiece and are deflected inwardly upon contact with the workpiece as designated by the arrows A. This deflection causes gage body legs 36 and 38 to spread away from the remainder of gage body 12, in the direction of arrows B. This deformation occurs through yielding of body 12 principally at webs 40 and 42, which act as hinges for this motion. Air bleed orifices 52 and 54 are connected with a pneumatic gaging system. As legs 36 and 38 spread away from body 12, the degree to which the orifices 52 and 56 are blocked changes, thus providing a gage output in accordance with well-known pneumatic gaging techniques. Various other types of gaging mechanisms could be implemented for measuring the separation of legs 36 and 38 from body 12 in accordance with this invention. Examples of such alternative gaging mechanisms include LVDT devices, piezo-electric devices, and devices using optical interference or other electrical, magnetic, or optical phenomenon for providing such an output.

Gage body 12 further includes a number of features which enable the set position between probe tips 14 and 16 to be adjusted. Along the diametric center plane separation 26, gage body 12 forms a pair of wedge or ramp surfaces 56 and 58. Through interaction with gage adjustment mechanism 20, which will be described below, adjustment pin 60 can be moved between the positions shown in FIG. 4, to that shown in FIG. 5, and acts on the ramp surfaces 56 and 58, causing the two diametric halves of gage body 12 to become separated, thus causing probe tips 14 and 16 to also become separated.

Gage body 12 includes a number of additional formations related to the adjustability of the device. Slits 62 and 64 extend to proximal end 24. Slits 74 and 76 cooperate with through-holes 66, 68, 70, and 72 to form webs 78, 80, 82, and 84 which enable gage body 12 to deform in a manner similar to the articulation of four-bar linkages during the adjustment process.

FIG. 4 shows gage 10 in an initial adjusted position. In this condition, adjustment pin 60 is displaced in its left-most position. In that position, adjustment pin 60 rests on leading edge areas of ramps 56 and 58. In FIG. 5, gage 10 is shown adjusted to a position where probe tips 14 and 16 are separated from the position shown in FIG. 4. That condition is caused by displacing adjustment pin 60 in the right-hand direction, thus causing it to ride "deeper" into ramp surfaces 56 and 58, separating the halves of gage body 12. This causes articulation of webs 78, 80, 82, and 84, as shown in FIG. 5. This articulation occurs without changing the separation between gage legs 36 and 38 and web 83 and 85, as shown in FIG. 5. Since the gage device essentially measures the change in position between legs 36 and 38 and webs 83 and 85, adjustment occurs without changing the output of the gage device.

Gage adjustment mechanism 20 includes components mounted to support block 18. Support block 18 is cylindrical in shape and is adapted for allowing gage 10 to be mounted within a stainless steel tubular casing with an outside diameter of 24.5 mm. Support block 18 is connected with gage body 12 by central plate 88. Support block 18 has a hollow interior, with threaded adjuster 90 mounted therein. Adjustment nut 20 can be rotated along threaded shaft 94, which, in turn, moves bushing 96. Displacement of bushing 96 causes displacement of side plates 98 and 100, which are, in turn, connected to opposite ends of adjustment pin 60. By rotating nut 92, the position of side plates 98 and 100 changes, thus moving adjustment pin 60 with respect to ramps 56 and 58, and causing a change in adjusted position between probe tips 14 and 16, as described previously.

Additional benefits and advantages of the present invention will become apparent to those skilled in the art to which this invention relates from the subsequent description of the preferred embodiments and the appended claims taken in conjunction with the drawings.

I claim:

1. A caliper gage device for measuring distance between at least two features of a workpiece, comprising:

an elongated gage block having a proximal and a distal end and forming first and second halves formed by a longitudinal separation, each of said halves further having first cuts longitudinally extending to said proximal end to form a leg;

first and second probe tips respectively coupled with said first and second gage block halves adjacent to said distal end, said probe tips adapted for contacting said workpiece features, wherein displacement of said probe tips causes said legs to deflect relative to said longitudinal separation;

a measuring device for measuring the deflection of said legs, thereby providing a measurement of the deflection of said probe tips; and an adjustment mechanism for causing said gage block halves to become separated by a predetermined distance to thereby change the separation distance between said probe tips.

2. The caliper gage device according to claim 1 further comprising: said gage block formed from a unitary blank of a metal material.

3. The caliper gage device according to claim 1 further comprising:

each of said first cuts terminating at a hole defining a hinge web of material of said block, said hinge web defining a hinge area for enabling angular deflection of said legs.

4. The caliper gage device according to claim 1 wherein said measuring device comprises:

an air gage including an orifice which is variably obstructed in relation to the degree of deflection of said legs.

5. The caliper gage device according to claim 1 wherein said adjustments mechanism comprises:

a threaded adjustment member mounted adjacent to said proximal end, at least one side plate extending from said threaded adjustment member and moveable by said threaded adjustment member, a pin member extending through said gage block longitudinal separation and engaging at least one ramp surface formed by said gage block such that movement of said pin member through actuation of said threaded adjustment member causes the position of said pin member with respect to said ramp surface to change, thereby causing the separation between said gage block halves to change.

6. The caliper gage device according to claim 1 further comprising: each or said gage block halves further defining second and third slits forming first, second, and third webs, said first web adjacent to said leg, and said second and third webs positioned between said first web and said longitudinal separation, whereby actuation of said adjustment mechanism causes the separation of said block halves to change and articulation of said second and third webs enables the separation of said legs and said first web to remain constant.

7. The caliper gage device according to claim 1 further comprising:

wherein measuring device measures the deflection of said leg from said first web.

8. The caliper gage device according to claim 1 further comprising:

said second and said third slits respectively terminating at through holes.

9. A caliper gage device for measuring distance between at least two features of a workpiece, comprising:

an elongated gage block having a proximal and a distal end and forming first and second halves formed by a longitudinal separation, each of said halves further having first cuts longitudinally extending to said proximal end to form a leg, said first cuts terminating at a hole defining a hinge web of material of said gage block, said web defining a hinge area for angular deflection of said legs, said gage block halves further defining second and third slits forming first, second, and third webs, said first web adjacent to said legs, and said second and third webs positioned between said first web and said longitudinal separation;

first and second probe tips respectively coupled with said first and second gage block halves adjacent to said distal end, said probe tips adapted for contacting said workpiece features, wherein displacement of said probe tips causes said legs to deflect in a direction away from said longitudinal separation; said gage block further forming ramp surface confronting said longitudinal separation, a measuring device for measuring the deflection of said legs from said second webs, thereby providing a measurement of the deflection of said probe tips; and an adjustment mechanism having a member engaging said ramp surfaces for causing said gage block halves to become separated by a predetermined distance to thereby change the separation distance between said probe tips.

10. The caliper gage device according to claim 9 further comprising:

said second and third slits terminating in through holes.

11. The caliper gage device according to claim 9 further comprising:

said gage block formed from a unitary blank of a metal material.

12. The caliper gage device according to claim 9 wherein said measuring device comprises:

an air gage including an orifice which is variably obstructed in relation to the degree of deflection of said leg from said first web.

13. The caliper gage device according to claim 9 wherein said adjustments mechanism comprises:

a threaded adjustment member mounted adjacent to said proximal end, at least one side plate extending from said threaded adjustment member and moveable by said threaded adjustment member, a pin member extending through said block longitudinal separation and engaging said ramp surface such that movement of said pin member through actuation of said threaded adjustment member causes the position of said pin member with respect to said ramp surface to change, thereby causing a change in the separation between said gage block halves.

* * * * *